Dec. 3, 1935.  A. PFAU  2,022,975
PRESSURE REGULATOR
Filed July 18, 1934  3 Sheets-Sheet 1

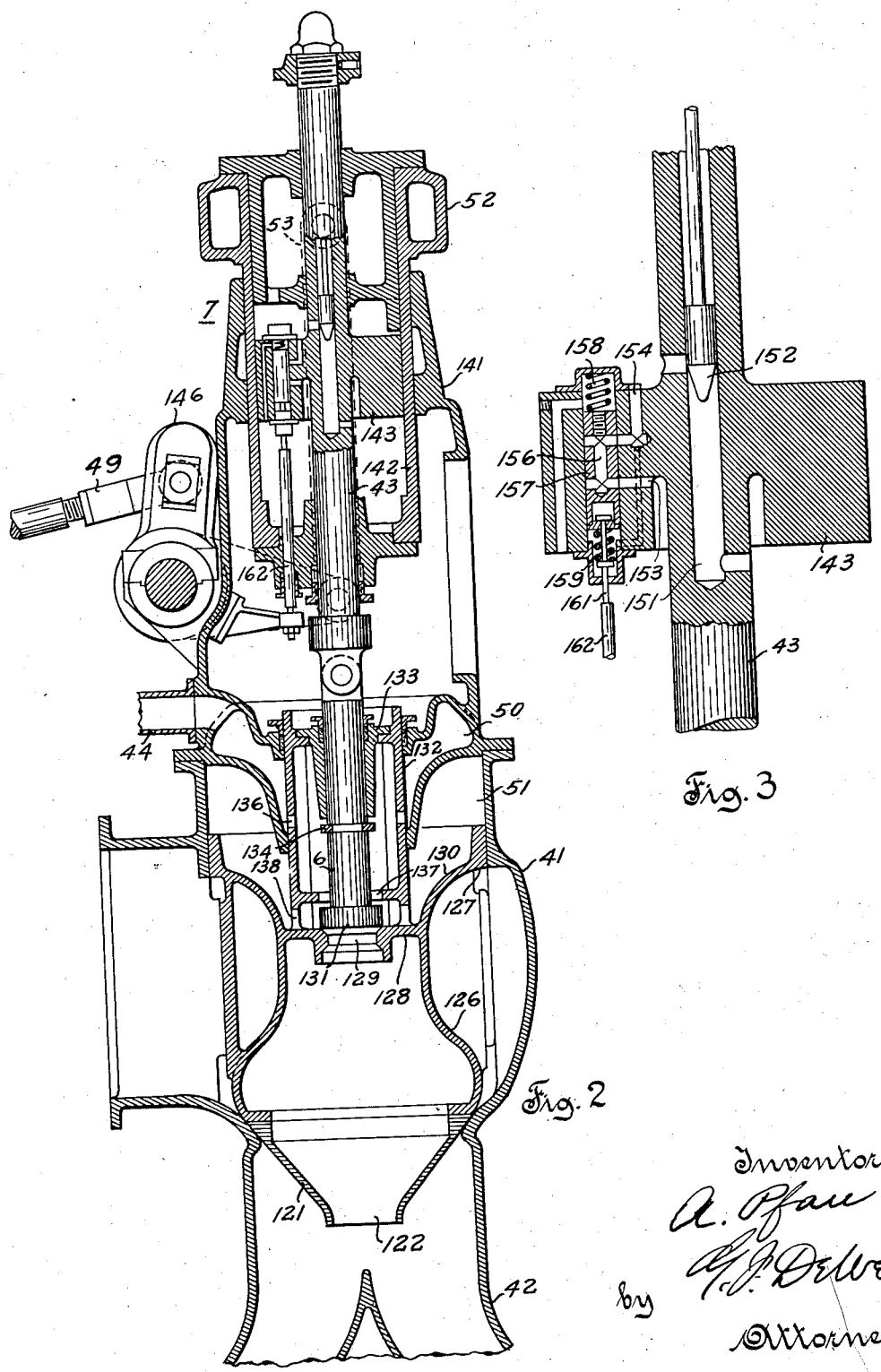

Dec. 3, 1935.   A. PFAU   2,022,975
PRESSURE REGULATOR
Filed July 18, 1934   3 Sheets-Sheet 3

Inventor
A. Pfau
by
Attorney

Patented Dec. 3, 1935

2,022,975

UNITED STATES PATENT OFFICE 2,022,975

PRESSURE REGULATOR

Arnold Pfau, Milwaukee, Wis., assignor to Allis-Chalmers Manufacturing Company, Milwaukee, Wis., a corporation of Delaware Application July 18, 1934, Serial No. 735,814

11 Claims. (Cl. 253—24)

This invention relates to improvements in control systems for hydraulic turbines and more particularly to means for limiting variations in the pressure of the fluid supplied to a turbine.

Hydraulic turbines are frequently supplied with operating fluid flowing through a pipe line or penstock under a predetermined hydraulic head. The fluid being confined within the penstock, any energy due to reduction or stopping of flow cannot be dissipated and such energy often results in wide variations in penstock pressure which may be dangerous to both the penstock and the turbine. During operation of the turbine, it however becomes necessary to vary the quantity of fluid flowing hence varying the pressure in the penstock dependent on the prevailing condition of operation. Variation in flow must be taken up either in a reservoir capable of receiving excessive flow of fluid upon reduction in quantity of fluid required and of supplying fluid when the quantity of fluid required is increased or means must be provided to permit discharge of the excessive flow during the period when the quantity required for operation of the turbine is suddenly decreased. Such reservoirs or surge tanks are however impractical under some conditions and other means for regulating the penstock pressure, such as a pressure relief valve, must be provided. Such valves should be operable either synchronously with or relatively to the operation of the flow control means of the turbine and should be so constructed as to have entirely self-contained operating mechanism which merely require a control impulse to commence the operating action. On no account should such relief devices be dependent, for their operating force, on the means for operating the gate of the turbine to secure proper relief action.

It is therefore among the objects of the present invention to provide a control system for hydraulic turbines in which a penstock pressure relief device is provided and is operable in response to a control impulse and without the supply of power thereto from an auxiliary or outside power device.

Another object of the invention is to provide a control system for hydraulic turbines in which a penstock pressure relief device is provided with means to secure positive opening or closing of the discharge opening from the penstock.

Another object of the invention is to provide a control system for hydraulic turbines in which a penstock pressure relief device is provided with means to prevent or retard movement of the turbine gate upon failure of the relief device to operate.

Another object of the invention is to provide a control system for hydraulic turbines in which a penstock pressure relief device is interconnected with the turbine gate control mechanism to secure either synchronous operation with or relative operation of the relief device to the turbine gate.

Another object of the invention is to provide a control system for hydraulic turbines in which a penstock pressure relief device is operable dependent on the rate of movement of the turbine gate.

Objects and advantages other than those above set forth will be apparent from the following description when read in connection with the accompanying drawings, in which:

Fig. 1 is a somewhat schematic view of a hydraulic installation with a diagrammatic showing of the governor and governor control means by which the operation of the gate of the hydraulic turbine is controlled and with a diagrammatic illustration of the relation of the various elements of the penstock relief device or pressure regulator to the other portions of the structure comprising the installation;

Fig. 2 is a vertical cross sectional view disclosing one embodiment of means for controlling pressure variations within a fluid supply conduit to a hydraulic turbine;

Fig. 3 is an enlarged partial view of the piston and the valve control therefor of the dashpot forming a portion of the structure illustrated in Fig. 2;

Figures 4, 5, 6:
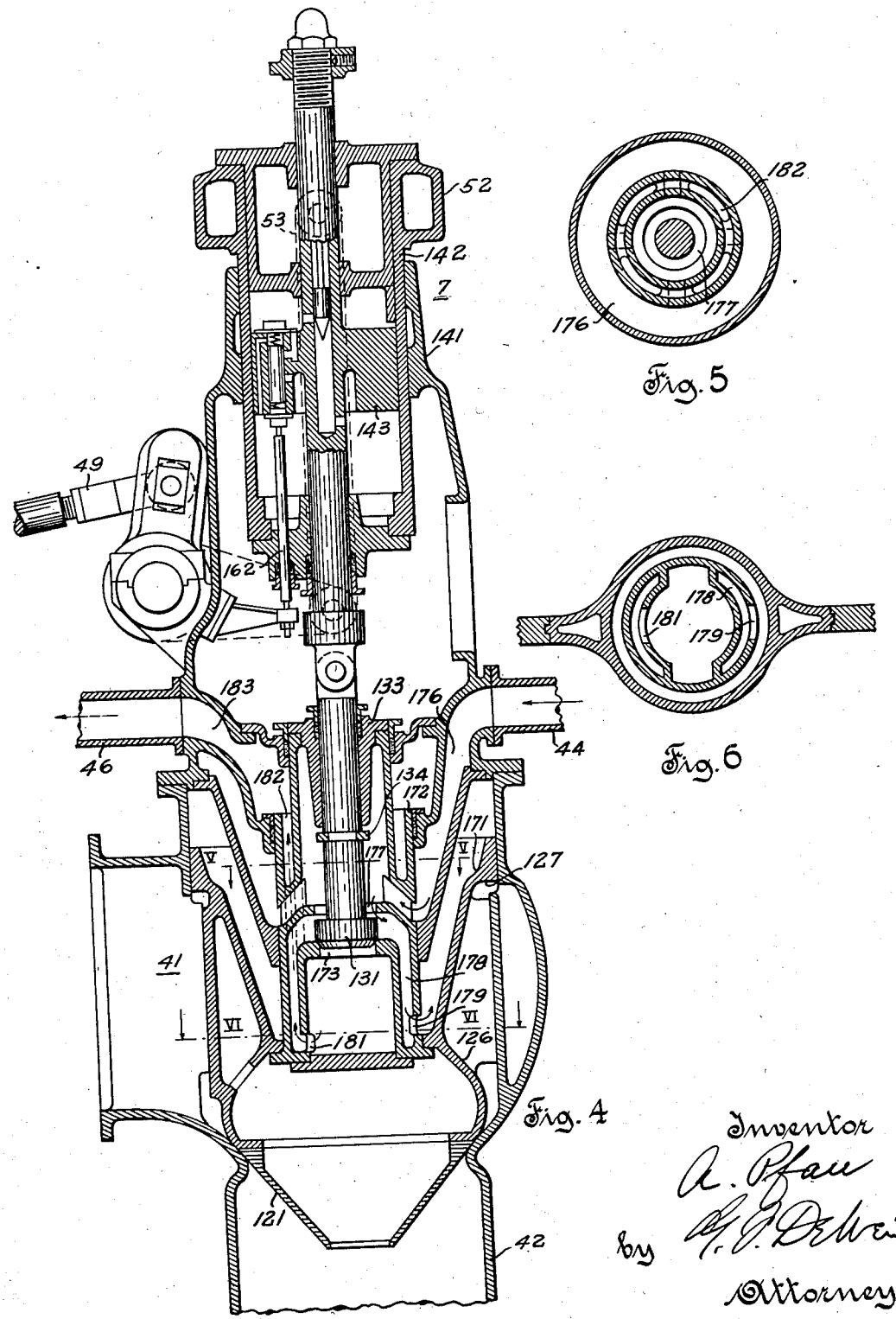
Fig. 4 is a modified form of a pressure regulator for use with hydraulic turbines to control pressure variations in the supply conduit to a hydraulic turbine.

Fig. 5 is a partial horizontal sectional view taken on the plane V—V of Fig. 4 to illustrate the passageways for the supply of fluid under pressure to a portion of the structure of the pressure regulator; and Fig. 6 is a horizontal partial sectional view taken on the plane VI—VI of Fig. 4 and illustrating the construction and arrangement of the fluid pressure passageways in the regulator at the plane.

Reference numeral 16 generally designates a hydraulic turbine herein illustrated as being of the reaction type and as being supplied with operating fluid from a penstock (not shown) through a spiral casing 17 and discharging into a draft tube 18. Supply of fluid from the spiral casing 17 is controlled by a gate 19 composed of movable vanes 15 connected with a shifting ring 14 having an upward extension 21. The shaft 22 of the turbine herein illustrated is provided with a speed governor 20 of which the speed sensitive member comprises the flyballs 23 connected with a collar 24 arranged about the shaft and movable in a vertical direction along the shaft as the flyballs are thrown outwardly by centrifugal force or are drawn inwardly due to the tension of the springs 13 connecting them, upon the reduction of such force. Movement of the collar 24 causes rocking of a bell crank lever 26 mounted on a fixed pivot 12 and movably connected at one end thereof, through a suitable link 11, with a lever 27, the other end of which is also movable as will be described hereinafter. A lever 28 is movably connected with the lever 27 and is connected through another bell crank lever 29 with the rod 10 of a piston valve generally designated by 31. Valve 31 is supplied with fluid from a source (not shown), which is preferably under constant pressure, through a conduit 32 and controls the flow of fluid through conduits 33 and 34 to opposite sides of the piston of a fluid pressure operated servo-motor 36. The piston rod 37 of the servo-motor is movably connected through a link 38 with the shifting ring 14 and the lever 27 is movably connected with the piston rod 37.

Figure 1:
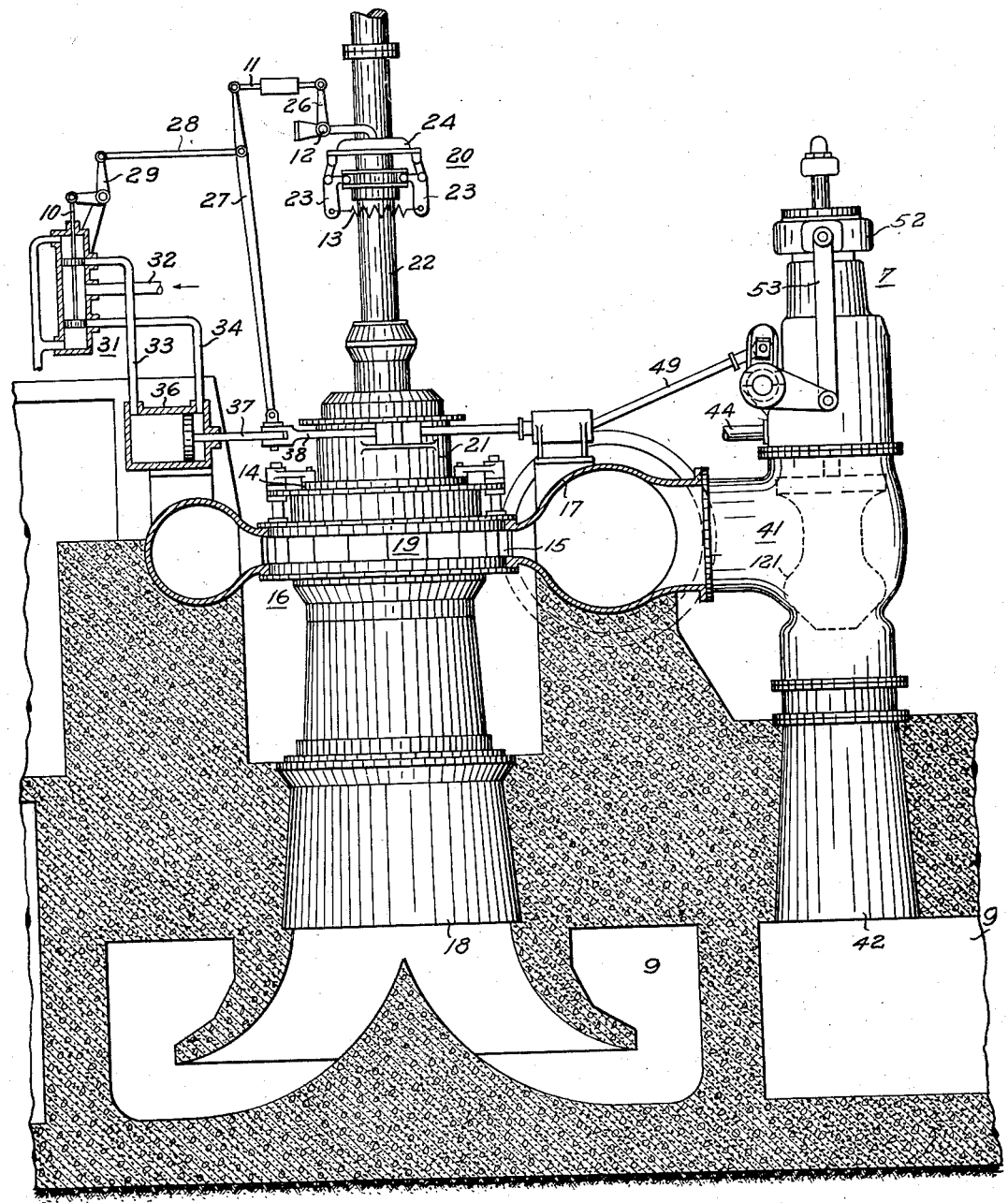

When the turbine speed increases, flyballs 23 are forced outwardly and the collar 24 is raised. Such action rocks lever 26 which acts through levers 27, 28 and 29 to shift the piston of the valve 31 which changes the connection of the pressure source with the servo-motor 36 and the servo-motor moves shifting ring 14 to change the position of the vanes of the turbine gate 19 to thereby decrease the quantity of fluid passing into the turbine, thus reducing the speed thereof. If the speed of the turbine is reduced rather than increased, the operation above described is reversed to increase the flow of fluid through the turbine and thus to increase the turbine speed. Due to the fact that the above speed control is well known and does not form one of the novel features of the invention, the control has been described only insofar as is required to permit complete understanding of the invention associated therewith. As shown in Fig. 1 of the drawings, the turbine is in normal operation and the turbine gate 19 is completely opened.

When the load on the turbine changes, as when load rejection is taking place and the gate 19 is being closed due to increase in speed of rotation of the turbine, pressure rises occur in the penstock due to retardation of the rate of movement of the water column in the penstock. Such pressure rises must be minimized or prevented by a pressure regulator which is essentially a relief valve generally designated at 41 and is connected between the spiral casing 17 and a discharge conduit 42 which is connected with the tailrace 9. Valve 41 is herein shown as being of the type in which the flow of fluid therethrough is controlled by a valve body which is operated by a device acting under fluid pressure. The admission of fluid pressure to the valve operating device is regulated by a control valve within the regulator structure which valve is connected with a source of fluid pressure such as the penstock by way of a conduit 44. Discharge from the piston or fluid pressure surfaces of the relief valve is regulated by the control valve 131 and such discharge may take place either into the discharge conduit 42 of the relief valve as illustrated in one embodiment of the invention or may take place externally thereof to some other point.

Due to the connections of the control valve of the pressure regulator with the shifting ring, the two portions of the structure may operate in synchronism, i. e., when the ring 14 is shifted to close the turbine gate 19, the pressure regulator is so operated that the pressure relief valve thereof is open and vice versa or the several portions of the structure may operate relative to each other due to the action of the dashpot 7 as will be apparent hereinafter.

The regulator in general comprises a dashpot subcombination 7, a control valve subcombination 131 and a pressure relief valve to control the occurrence of conditions which might cause pressure variations within the penstock. The relief valve itself is generally designated by the reference numeral 121 and is arranged in the bend of the discharge conduit 42 and is in the form of a hollow substantially cylindrical member with a frusto conical end which provides a discharge port 122 for a purpose which will appear hereinafter. The relief valve 121 rests on a seat formed in the conduit 42. The central portion of the valve body is constricted thus providing annular piston surfaces 126 and 127 on which the penstock pressure acts. The upper piston surface 127 is however larger than the lower piston surface 126 so that the valve 121 is normally urged or biased upwardly in a direction to allow discharge of water through the valve and into the tailrace 9. A partition 128 provided with a port 129 is formed across the interior of the valve body 121 and together with other portions of the valve body provides a piston surface 130 which, when pressure is admitted thereto, overcomes the bias of the valve 121 in the opening direction and retains the valve in its closed position as shown.

The port 129 is opened or closed by a valve 131 with a stem 6 extending upwardly and forming a portion of the rod 43 for the piston of a dashpot 7 to be described. The partition 128 is formed with a hollow cylindrical upward extension 132 which projects through a chamber 50 connected with inlet pressure conduit 44. The stem 6 of valve 131 is guided and sealed in a sealing gland 133 extending downward into extension 132. The valve stem 6 is provided with a collar 134 which limits the movement of valve 131 by abutting against the lower end of gland 133 and provides for a direct connection of the dashpot piston and the relief valve 121. Fluid entering through conduit 44 may flow through ports 136, port 137 controlled by valve 131 and port 138 into the chamber 51 above piston surface 130. The fluid is discharged from piston surface 130 through port 129 and through valve 121 upon movement of valve 131.

The control valve 131 is operated by a dashpot 7 which includes a cylindrical extension 141 from the casing of valve 121 for supporting and guiding a movable cylinder 142. A piston 143 is formed as a portion of the extension of the stem of the control valve 131 and operates within the cylinder 142 upon movement of a yoke 52 connected with the cylinder 142, the yoke 52 being connected with a bell crank lever 146 and links 53 operated by the pushrod 49. The piston 143 is formed with two bypasses to allow flow of fluid from one side of the piston to the other which permits movement of the piston, under conditions which will be described. One of the bypasses is formed by a passageway 151 through the piston 143 and the piston rod with side apertures into the passageway on each side of the piston. Flow of fluid through the passageway 151 is controlled by a needle valve 152 which extends through the piston rod and is adjustable at the upper end thereof in any suitable manner. The other bypass is formed by passages 153 and 154 formed in the piston 143 and connected by a passageway 156 through a floating slide valve 157 reciprocable in a chamber formed in the piston. The position of the slide valve 157 is controlled by the degree of compression of a spring 158 abutting against one end of the valve and the degree of compression of a spring 159 abutting against the other end of the valve. The spring 159 together with a pin 161 forms a movable coupling which, in some positions of the piston 143, abuts against an adjustable stop 162 mounted on the cylinder guide 141 and extending into the cylinder 142 through a suitable sealing gland.

The operation of the regulator will now be described, considering the various operations thereof enumerated below, from the position shown which is the position when operating fluid under pressure is being passed through the turbine; considering separately the condition (a) when the turbine gate is slowly closed, the condition (b) when the turbine gate is rapidly closed, the condition (c) when the turbine gate is being opened with the pressure relief valve in closed position as when the turbine is being started, the condition (d) when the turbine gate is again opening with the relief valve still partially open and when load change takes place, and the emergency condition (e) when the relief valve is off its seat and is sticking when the turbine gate is being either opened or closed.

In condition (a) when the turbine gate is slowly closed, the pushrod 49 slowly moves toward the left and tends to lift the dashpot cylinder 142 thereby tending to lift piston 143. Fluid within the cylinder is compressed below the piston 143 and flows through the bypass 151 and through the bypass formed by the passageways 153, 154 and 156. The excess of the pressure below the piston 143 over the pressure above the piston acts on the slide valve 157 and tends to compress the upper spring 158. Piston 143 is connected with the control valve 131 and remains in the position shown as long as the excess pressure below the piston is not sufficient to cause valve 157 to close. The piston 143 therefore remains in the position shown and control valve 131 remains in its lowermost position, thus retaining the fluid pressure on relief valve piston surface 130 and keeping the valve closed. As long as the pressure on the piston 143 does not exceed a predetermined amount, the slide valve 157 will remain open and fluid may flow through the bypass 153, 156 and 154 as well as the bypass 151. The turbine gate 19 may continue to close slowly without causing any further action in the pressure regulator other than continued upward movement of the cylinder 142. The cylinder is so dimensioned that such upward movement may continue until the turbine gate is fully closed. The cylinder 142 then remains in the lifted position until the turbine gate is again opened when a reverse movement takes place which will be described hereinafter.

In the condition (b) when the turbine gate is rapidly closed, the various elements of the regulator being in the position shown, rapid movement of the pushrod 49 takes place toward the left and lifts the dashpot cylinder 142 and piston 143 rapidly. Such upward action of the piston is, however, limited by the restriction of the bypass 151 by the needle valve 152 and by the action of the slide valve 157 which latter closes after a predetermined pressure difference is produced between the two sides of the piston. During the first few moments of the movement of the cylinder 142 the pressure produced below the piston acts on the slide valve member 157 to compress the spring 158, thus closing the ports 153 and 154. Fluid can then flow from the lower side of the piston to the upper side thereof at a rate determined only by the setting of the needle valve 152. The piston 143 therefore lifts. Such lifting of the piston 143 lifts the control valve 131 from its lower seat thereby releasing discharge fluid pressure through the port 129 previously closed by control valve 131 and shutting off supply of fluid through the port 138. During movement of the control valve from one of its seats to the other, fluid pressure from the conduit 44 discharges through ports 129 and 122 thus relieving pressure on the piston surface 130. The relief valve 121 then opens due to the higher pressure on the piston surface 127. Opening of the valve 121 tends to again seat the control valve 131 to close port 129 but upward movement of the piston 143 has continued until the turbine gate 19 is fully closed when both the dashpot cylinder 142 and the piston 143 are in their extreme upper position. If the turbine gate 19 then remains closed, the force acting to cause piston 143 to remain disappears because the pressures on both sides of the piston are equalized by fluid flow through the bypass 151 and bypass 157 reopens due to action of spring 158 which now expands. Due to the connection of valve 131 with piston 143, the valve gradually drops, thus closing port 129 and causing pressure to build up on piston surface 130 which recloses valve 121.

In the condition (c) when the turbine gate is slowly opening with the relief valve in closed position, it being desired that the relief valve remain closed, the pushrod 49 moves toward the right, thereby depressing cylinder 142 which produces an overpressure above piston 143. Floating valve 157 may be closed and fluid therefore may flow between the sides of the piston at a rate determined by the free area of only the bypass 151. Valve 131 therefore remains closed, retaining pressure on piston surface 130 which keeps valve 121 closed. Unretarded slow movement of the gate 19 is thus permitted and the pressure regulator relief valve remains closed.

In condition (d) when the turbine gate is again opening and when the relief valve is still partially open, if the turbine load decreases, slow closing of the relief valve, as described under condition (b), is interrupted. When the load again increases the turbine gate tends to open quickly and the rod 49 tends to move quickly toward the right. The cylinder 142 is then depressed, thus depressing piston 143, and causing piston 143 to move substantially with movement of the cylinder 142. Valve 131 is then depressed until port 137 is opened and port 129 is closed. Pressure is applied to piston surface 130 and valve 121 then closes.

If the relief valve should stick when off its seat in condition (e), an emergency arises which the valve and the pressure regulator as a whole must meet. Such sticking may occur either when the turbine gate is closing and the valve is opening or when the turbine gate is opening and the valve is closing. When the gate is closing, pushrod 49 is moving toward the left, lifting cylinder 142 and producing pressure under the piston 143 which lifts the valve 131. Supply of pressure to the piston surface 130 is therefore interrupted and the fluid under pressure on the piston surface is allowed to discharge. The relief valve 121 will therefore open. If the valve 121 sticks, upward movement of the piston 143 continues only until the collar 134 is firmly seated against the end of the sealing gland 133. Continued upward movement of the cylinder 142 produces sufficient pressure below the piston to close the slide valve 157, the valve 157 moving away from stop 162. The piston 143 being now positively locked with valve 121, the servo-motor 36 must move the valve or be retarded to a rate dependent upon the resistance of the sticking valve 121. If the valve cannot be moved at all, the servo-motor can close the gates only at a rate dependent upon the rate of fluid flow through the piston bypass 151. The closing gate motion is thus retarded to such slow rate as will not cause dangerous pressure increases in the penstock or the spiral casing attached thereto.

When the gate 19 is opened and the valve 121 is closing and sticks during the closing operation, the reverse of the above action takes place with the exception that the control valve 131 closes the discharge port 129 and opens the supply port 128, thus applying pressure on the piston surface 130 which tends to close the valve.

In the modification of the present invention illustrated in enlarged detail in Figs. 4, 5 and 6, the pressure regulator is disclosed as again comprising a pressure operated relief valve 41; a valve 131 for controlling the supply of fluid pressure to, and the discharge of pressure from, the several piston surfaces of the relief valve, and a dashpot piston surfaces of the control valve 131 with the lever 7 connecting the control valve 131 with the lever system leading to the shifting ring 14 as shown in Fig. 1. The dashpot is similar, in its construction and operation, to that illustrated and described relative to Figs. 2 and 3 and, therefore, requires no further description.

The relief valve 121 of the embodiment disclosed in the figures now under consideration, is again a hollow substantially cylindrical member with a constricted central portion forming piston surfaces 126 and 127, and is formed with frustoconical surfaces forming a piston surface 171 and is formed with a member 172 extending upward and closing off the interior of the valve from the end thereof. The member 172 is substantially cylindrical and is formed with a plurality of ports and passageways through which the supply of fluid pressure to, and the discharge of fluid pressure from, the piston surface 171 is controlled by the valve 131 which seats in the member 172 and is operated by the dashpot piston 143. When the valve 131 is in the position shown, fluid pressure from the supply conduit 44 flows in the path indicated by the full line arrows through the passageway 176, the port 177, the passageway 178 and the port 179 into the chamber above the piston surface 171. Such surface area plus the area of the piston surface 126 is greater than the area of the piston surface 127 and the valve is accordingly held in its closed position. When the control valve 131 is raised to close off the port 177 and to open the port 173, flow of fluid through the passageway 176 and the port 177 is blocked and fluid may discharge from above the piston surface 171 by a passageway indicated by dotted line arrows through the port 179, port 173, the port 181 and the passageway 182 into the discharge chamber 183 connected with the discharge conduit 46. It will be seen that the valve 131 may move relative to the member 172 by the distance between the collar 134 and the end of the sealing gland 133 by which the stem of valve 131 is sealed in the extension 172. The extension 172 is secured to and moves with the relief valve 121, thus requiring that suitable sealing glands be provided between the pressure supply passageway 176 and the discharge chamber 183 and also between the discharge chamber 183 and the interior of the dashpot cylinder guide 141.

The operation of the embodiment of the invention described immediately above will now be considered relative to the same conditions as were previously considered in explaining the operation of the embodiments first illustrated and described in the present application. It is again assumed that the turbine gate is open and that the pressure regulator is closed, all portions of the regulator being then in the position shown in the drawings.

When the several elements of the pressure regulator are in the position shown in the drawings and the turbine gate is being slowly closed, the operation of the modification now being considered is the same as was previously described. The gate 19 may continue to close slowly without producing any material pressure increases in the penstock.

When the turbine gate is closing quickly, the relief valve 121 being in closed position as shown, the pushrod 49 moves quickly toward the left, thus producing a high pressure in the fluid below the piston 143. The floating slide valve 157 closes and the pressure in the lower portion of the cylinder 142 forces the piston 143 to rise which lifts the valve 131 to close port 177 and to open port 173. The supply of fluid pressure to the piston surface 171 is thus cut off and the fluid pressure discharges from above the piston surface through the ports 179, 173, 181, the passageways 182 and 183 as indicated by dotted line arrows. The penstock pressure on the piston surface 127 then lifts the valve 121 and allows discharge of water from the spiral casing through the tube 42 to the tailrace 9 which limits pressure rises in the penstock and the spiral casing 17. When movement of the rod 49 and hence lifting of the cylinder 142 has reached its end position, the gate 19 is fully closed. Piston 143 is then in its uppermost position and is stationary due to equalization of pressure on the two sides of the piston. The force acting on the valve 131 causes piston 143 to drop slowly, thus opening the supply port 177 and closing off the discharge port 173. Pressure is then again applied to the piston surface 171 through the supply conduit 44, the passageway 176, port 177, passageway 178 and the port 179 as indicated by the full line arrows. Valve 121 then slowly closes at the rate of oil flow through both bypasses in the dashpot piston 143, and flow of water through the penstock is completely cut off.

When the gate 19 is opening slowly while the relief valve 121 is still closed as in starting operation of the turbine, the pushrod 49 moves toward the right and the cylinder 142 is slowly depressed. Valve 157, being in contact with stop 162, cannot however close and fluid may thus flow through both bypasses between the two sides of the piston 143 thus preventing production of substantial pressure above the piston. The piston, therefore, remains stationary or is very slightly depressed. The control valve 131 is thus kept in its lowermost position and the discharge port 173 remains closed. Fluid pressure is retained on the piston surface 171 and the valve 121 remains closed. All of the water supplied by the penstock must therefore flow through the turbine and no water is wasted through the pressure regulator.

The condition when the turbine gate is slowly opening while the relief valve 121 is still partially opened and is closing must be considered relative to both the condition when the load decreases and when the load increases. Closing of the gate causes movement of the rod 49 toward the left, which lifts cylinder 142 and produces pressure below the piston 143. The pressure is, however, relatively low and both the bypasses through the piston therefore remain open. The piston 143 accordingly remains stationary or tends to be only slightly lifted and the control valve 131 is kept down which keeps port 173 closed. Pressure is retained on the piston surface 171 and the relief valve 121 continues to close. If a sudden load decrease now occurs, the movement of rod 49 and of cylinder 142 is accelerated which produces such pressure below piston 143 to open valve 131 and allows relief valve 121 of reopen, thus decreasing the quantity of water flowing through the turbine to decrease power produced thereby as required by the system. If a sudden load increase, however, takes place, the rod 49 accelerates its movement toward the right, thus depressing cylinder 142 which depresses control valve 131 to close the discharge port 173. Fluid pressure is then supplied to the piston surface 171 and valve 121 is closed to prevent further discharge of water now required for operation of the turbine. The gate 19 may then continue to open until equilibrium flow conditions are established without further movement of the regulator.

Under the condition previously mentioned, when the gate is being opened and the pressure regulating valve is being closed, the rod 49 is moved toward the right and the cylinder 142 is depressed to retain the control valve 131 in the lowermost position, thus keeping port 173 closed which retains the pressure on the piston surface 171 and causes the relief valve 121 to continue to close. If the valve should now stick, emergency condition e arises, during the closing operation thereof, the downward movement of the piston 143 continuing, a force from the servo-motor 36 is applied to the valve 131 and hence to the valve 121 to tend to close the latter. Resistance of the valve to movement retards the movement of the servo-motor and the gates can open only at the rate of movement of the dashpot piston 143 in the cylinder 142. When the gates are closing and the regulator is opening, if sticking of the valve 121 should occur, the reverse actions to those above described takes place, thus limiting pressure increases in the penstock.

Although but two embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. A control system for hydraulic turbines comprising means controlling the flow of fluid through he turbine, means controlling the operation of the first said means, a dashpot connected with the first said means and operated thereby, a fluid pressure operated valve connected with said dashpot for limiting pressure variations in the fluid supplied to the turbine, the fluid pressure operated means for actuating said valve having differential piston surfaces and having passageways therethrough for the supply of fluid pressure to and the discharge of fluid pressure from one of the piston surfaces, and a valve connected with said dashpot for controlling the fluid pressure applied to the said one of the piston surfaces.

2. A control system for hydraulic turbines comprising means controlling the flow of fluid through the turbine, means controlling the operation of the first said means, a dashpot connected with the first said means and operated thereby, a fluid pressure operated valve connected with said dashpot for limiting pressure variations in the fluid supplied to the turbine, the fluid pressure operated means for actuating said valve having differential piston surfaces and having passageways therethrough for the supply of fluid pressure to and the discharge of fluid pressure from one of the piston surfaces, and a valve directly connected with said dashpot for controlling the fluid pressure applied to the said one of the piston surfaces.

3. A regulator for limiting pressure variations in the fluid flowing through a hydraulic turbine and comprising a fluid pressure operated valve connected with the turbine to relieve excesses in pressure of the fluid supplied thereto, a dashpot actuated in response to the quantity of fluid flowing through the turbine, and a valve directly connected with said dashpot and located in the path of flow of fluid pressure supply to said relief valve to control the flow of fluid pressure to and from said relief valve.

4. A regulator for limiting pressure variations in the fluid flowing through a hydraulic turbine and comprising a fluid pressure operated valve connected with the turbine to relieve excesses in pressure of the fluid supplied thereto, said valve having differential piston surfaces and being formed with passageways therein, a dashpot actuated in response to the quantity of fluid flowing through the turbine, and a valve directly connected with said dashpot to control the inflow and outflow of fluid pressure through the passageways to the piston surfaces of said relief valve.

5. A regulator for limiting pressure variations in the fluid flowing through a hydraulic turbine and comprising a fluid pressure operated valve connected with the turbine to relieve excesses in pressure of the fluid supplied thereto, a dashpot actuated in response to the quantity of fluid flowing through the turbine, said dashpot including a movable cylinder with a piston movable therein, the piston having a plurality of bypasses acting independently of each other to vary the operation of said dashpot in either direction, and a valve directly connected with said dashpot to control the flow of fluid pressure to said relief valve.

6. A regulator for limiting pressure variations in the fluid flowing through a hydraulic turbine and comprising a fluid pressure operated valve connected with the turbine to relieve excesses in pressure of the fluid supplied thereto, a dashpot actuated in response to the quantity of fluid flowing through the turbine, said dashpot including a movable cylinder with a piston movable therein, the piston having a bypass controlled in either direction by the rate of change in relative movement of the cylinder and the piston and a bypass unaffected by such relative movement, and a valve directly connected with said dashpot to control the flow of fluid pressure to said relief valve.

7. A regulator for limiting pressure variations in the fluid flowing through a hydraulic turbine and comprising a fluid pressure operated valve connected with the turbine to relieve excesses in pressure of the fluid supplied thereto, a dashpot actuated in response to the quantity of fluid flowing through the turbine, said dashpot including a movable cylinder with a piston movable therein, and a valve rigidly connected with the piston of said dashpot to control the flow of fluid pressure both to and from said relief valve.

8. A regulator for limiting pressure variations in the fluid flowing through a hydraulic turbine and comprising a fluid pressure operated valve connected with the turbine to relieve excesses in pressure of the fluid supplied thereto, said valve having differential piston surfaces and being formed with passageways therein, a dashpot actuated in response to the quantity of fluid flowing through the turbine, said dashpot including a movable cylinder with a piston movable therein, and a valve rigidly connected with the piston of said dashpot to control the flow of fluid pressure through the passageways to and from the piston surfaces of said relief valve.

9. A regulator for limiting pressure variations in the fluid flowing through a hydraulic turbine and comprising a fluid pressure operated valve connected with the turbine to relieve excesses in pressure of the fluid supplied thereto, said valve having differential piston surfaces and being formed with passageways therein, a dashpot actuated in response to the quantity of fluid flowing through the turbine, said dashpot including a movable cylinder with a piston movable therein having a bypass, and a valve rigidly connected with the piston of said dashpot to control the flow of fluid pressure through the passageways to and from the piston surfaces of said relief valve, and means for retaining the bypass in a predetermined position during closed position of said relief valve.

10. A regulator for limiting pressure variations in the fluid flowing through a pipe line and comprising a fluid pressure operated valve connected with the pipe line to relieve excesses in pressure of the fluid flowing therethrough, a dashpot actuated in response to conditions causing pressure variations in the pipe line and including a movable cylinder having a piston movable therein, the piston having a plurality of bypasses independently operable under different pressure conditions in the cylinder, and a valve connected with said dashpot to control the flow of fluid pressure to and from the actuating means of said relief valve.

11. A regulator for limiting pressure variations in the fluid flowing through the servo-motor operated gate of a hydraulic turbine and comprising a fluid pressure operated valve connected with the turbine to relieve excesses in pressures of the fluid supplied thereto, a dashpot actuated in response to conditions causing pressure variations in the fluid flowing through the turbine and including a movable cylinder having a piston movable therein, a valve rigidly connected with the dashpot piston to control the flow of fluid pressure both to and from the actuating means for said relief valve, and means for limiting the stroke of said control valve and for indirectly but positively connecting said relief valve with the servo-motor for partially controlling operation thereof under predetermined conditions of operation of the regulator.

ARNOLD PFAU.